(12) United States Patent
Sedouram et al.

(10) Patent No.: US 12,254,172 B2
(45) Date of Patent: Mar. 18, 2025

(54) RATE-ADAPTIVE CONTENT CONTAINER

(71) Applicant: Google LLC, Mountain View, CA (US)

(72) Inventors: Ramprasad Sedouram, Bangalore (IN); Safia Ali, Lahore (PK); Shailly Kishtawal, Bangalore (IN); Merlyn Fraga Francis Xavier, Bengaluru (IN); Bhavinee Vyas, Bengaluru (IN); Jaunani Sriramachandran, Chennai (IN); Manasi Rajan Kothari, Bengaluru (IN); Apoorv Gupta, Lucknow (IN)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/013,067

(22) PCT Filed: Aug. 24, 2022

(86) PCT No.: PCT/US2022/041309
§ 371 (c)(1),
(2) Date: Dec. 27, 2022

(87) PCT Pub. No.: WO2024/015086
PCT Pub. Date: Jan. 18, 2024

(65) Prior Publication Data
US 2024/0192842 A1    Jun. 13, 2024

(30) Foreign Application Priority Data
Jul. 12, 2022   (IN) .............................. 202221040058

(51) Int. Cl.
*G06F 3/0485*   (2022.01)
*G06F 3/0481*   (2022.01)
*H04N 23/695*   (2023.01)

(52) U.S. Cl.
CPC .......... *G06F 3/0485* (2013.01); *G06F 3/0481* (2013.01); *H04N 23/695* (2023.01)

(58) Field of Classification Search
CPC .... G06F 3/0485; G06F 3/0481; H04N 23/695
See application file for complete search history.

(56) References Cited

U.S. PATENT DOCUMENTS 9,030,419 B1 *   5/2015   Freed ...................... G06F 16/54
                                                       345/169
9,921,711 B2 *   3/2018   Oh ...................... G06F 3/04812
(Continued)

OTHER PUBLICATIONS

Joshua Leung et al., An Empirical Evaluation of Collapsible Panel Interfaces, Dec. 16, 2020, IEEE Asia-Pacific Conference on Computer Science and Data Engineering, pp. 1-6 (Year: 2020).*
(Continued)

*Primary Examiner* — Tam T Tran
(74) *Attorney, Agent, or Firm* — DORITY & MANNING P.A.

(57) ABSTRACT

Embodiments according to examples aspects of the present disclosure provide for an example computer-implemented method. The example method can include obtaining a data structure configured for rendering a plurality of content containers on a user device, the plurality of content containers providing a collapsed configuration and an expanded configuration. The example method can include rendering, based on a first rate parameter descriptive of a user input associated with the user device, one or more of the plurality of content containers according to the collapsed configuration. The example method can include rendering, based on a second rate parameter, at least one of the plurality of content containers according to the expanded configuration.

23 Claims, 10 Drawing Sheets

(56) References Cited

U.S. PATENT DOCUMENTS

| | | | |
|---|---|---|---|
| 2014/0240363 A1* | 8/2014 | Hong | G06F 3/0485 345/684 |
| 2017/0025096 A1* | 1/2017 | Fan | G06F 3/0482 |
| 2021/0303107 A1* | 9/2021 | Pla I Conesa | G06F 3/017 |

OTHER PUBLICATIONS

Lei Zhang et al., Accelerating Mobile Web Browsing with Screen Scrolling, Jun. 1, 2017, IEEE/ACM 25th International Symposium on Quality of Service, pp. 1-2 (Year: 2017).*
International Search Report and Written Opinion for Application No. PCT/US2022/041309, mailed Mar. 16, 2023, 12 pages.
International Preliminary Report on Patentability for Application No. PCT/US2022/041309, mailed Jan. 23, 2025, 8 pages.

* cited by examiner

RATE-ADAPTIVE CONTENT CONTAINER

RELATED APPLICATIONS

The present application is based upon and claims the right of priority under 35 U.S.C. § 371 to International Application No. PCT/US2022/041309, filed on Aug. 24, 2022. International Application No. PCT/US2022/041309 is hereby incorporated by reference herein in its entirety. International Application No. PCT/US2022/041309 claims priority to and the benefit of Indian Provisional Patent Application No. 202221040058, filed Jul. 12, 2022. Indian Provisional Patent Application No. 202221040058 is hereby incorporated by reference herein in its entirety.

FIELD

The present disclosure relates generally to content rendering containers. More particularly, example aspects of the present disclosure relate to rate-adaptive content container configurations.

BACKGROUND

Users interact with content at a variety of speeds. In some situations, users may engage with content quickly. In other situations, users may engage with content slowly. For instance, scrollable interfaces can be scrolled at different speeds to browse content quickly or slowly.

SUMMARY

Aspects and advantages of embodiments of the present disclosure will be set forth in part in the following description, or can be learned from the description, or can be learned through practice of the embodiments.

Embodiments according to examples aspects of the present disclosure provide for an example computer-implemented method. The example method can include obtaining a data structure configured for rendering a plurality of content containers on a user device, the plurality of content containers providing a collapsed configuration and an expanded configuration. The example method can include rendering, based on a first rate parameter descriptive of a user input associated with the user device, one or more of the plurality of content containers according to the collapsed configuration. The example method can include rendering, based on a second rate parameter, at least one of the plurality of content containers according to the expanded configuration.

In some embodiments of the example method, the first rate parameter corresponds to a scroll speed. For instance, in some embodiments, the example method can include rendering, on a displace device, an animation of scrolling through the one or more of the plurality of content containers according to the collapsed configuration, the animated scrolling corresponding to the scroll speed.

In some embodiments of the example method, the second rate parameter corresponds to a scroll speed decay rate. In some embodiments of the example method, the second rate parameter corresponds to an interrupting scroll speed of a second user input. For instance, in some embodiments of the example method, the interrupting scroll speed indicates a reverse scroll direction. In some embodiments of the example method, the interrupting scroll speed corresponds to a decreased scroll speed. In some embodiments of the example method, the interrupting scroll speed corresponds to a scroll stop event.

In some embodiments of the example method, the example method can include rendering first party content from a first server system in the one or more of the plurality of content containers according to the collapsed configuration. In some embodiments of the example method, the example method can include rendering third party content from a second server system in the at least one of the one or more of the plurality of content containers according to the expanded configuration. For instance, in some embodiments of the example method, the third party content can be fetched from the second server system responsive to determining the second rate parameter.

In some embodiments of the example method, the example method can include transmitting, to the second server system, responsive to determining the second rate parameter, a request for additional content based on the first party content.

In some embodiments of the example method, the example method can include rendering a first set of third party content from a server system in the one or more of the plurality of content containers according to the collapsed configuration. In some embodiments of the example method, the example method can include rendering a second set of third party content from the server system in the at least one of the one or more of the plurality of content containers according to the expanded configuration, wherein the second set comprises additional content relating to an element of the first set.

In some embodiments of the example method, the first rate parameter corresponds to a speed of motion of the user device relative to an environment of the user device. In some embodiments of the example method, the second rate parameter corresponds to a second, different speed of motion of the user device relative to the environment.

In some embodiments of the example method, the first rate parameter corresponds to a panning speed of an image sensor of the user device. In some embodiments of the example method, the second rate parameter corresponds to a second, different panning speed of the user device.

In some embodiments of the example method, the user device comprises a wearable component.

Embodiments according to example aspects of the present disclosure provide for one or more example non-transitory computer-readable storage media storing instructions that are executable to cause one or more processors to perform operations. In some embodiments, the operations can include the example method.

Embodiments according to example aspects of the present disclosure provide for an example system comprising the one or more example non-transitory computer-readable storage media.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
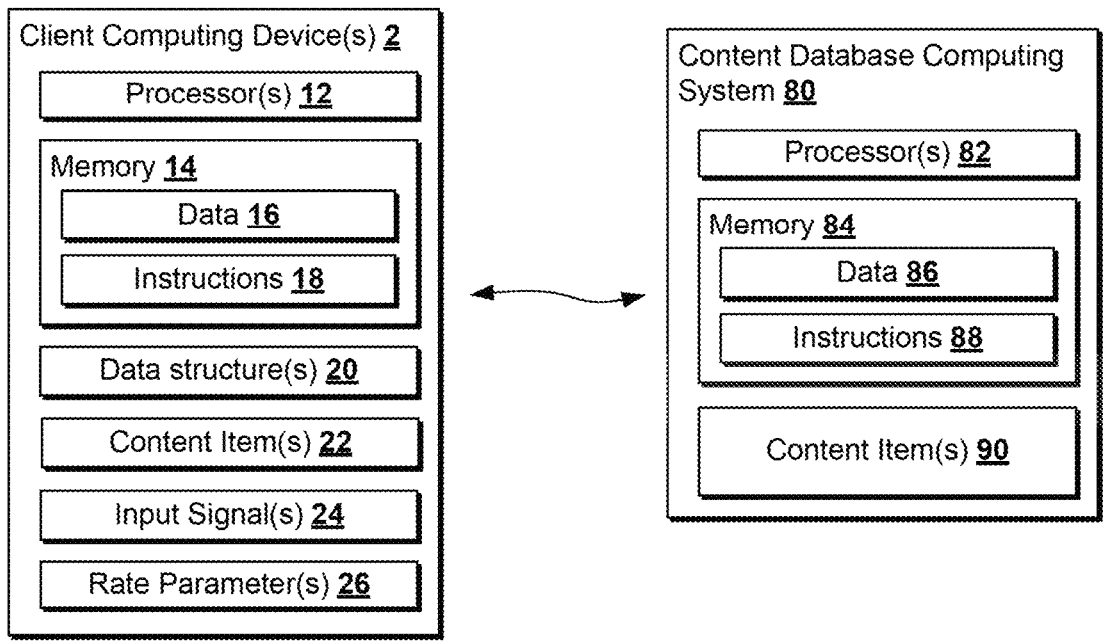
FIG. 1A depicts a block diagram of an example system for implementing rate-adaptive content containers according to example embodiments of the present disclosure.

Reference numerals that are repeated across plural figures are intended to identify the same features in various implementations.

DETAILED DESCRIPTION

Overview

Example embodiments according to aspects of the present disclosure relate to a rate-adaptive content container for rendering content in variable configurations based on a rate of engagement with the content. For example, in some embodiments, a rate of engagement can be determined based on a user's interaction with a display device. For instance, content can be rendered on a display device having a scrollable interface, and the user can scroll through the interface to browse content items rendered using rate-adaptive content containers. Based on the speed with which the user scrolls the interface, the rate-adaptive content containers can adapt accordingly to facilitate optimized rendering of the content items by being displayed according to differently sized rendering modes based on the rate of engagement with the content.

For instance, in some embodiments, the rate-adaptive content containers can provide for a collapsed configuration and an expanded configuration. The collapsed configuration can be configured for rendering high-level aspects of the content item that are optimal for rapid consumption at a quick pace. In this manner, for instance, the collapsed configuration can be used to present the content items when the user is rapidly interacting with the interface (e.g., scrolling quickly). Similarly, the expanded configuration can be configured for rendering more detailed or related aspects of the content item that are more suited to deliberate consumption (e.g., at a slower pace). In this manner, for instance, the expanded configuration can be used to present the content items when the user is interacting with the interface at a slower rate (e.g., scrolling slower, halted scrolling, etc.).

In some embodiments, the rate parameter(s) for selecting the configurations for the content containers can be based on various inputs to a user device. For instance, an input to a user device can be a scroll input to a navigation interface of a user device (e.g., a touch screen, etc.). In some examples, various device sensors (e.g., inertial sensors, location sensors, image sensors, etc.) can provide input(s) indicating that the device itself is moving with respect to an environment.

For example, in some embodiments, a user device can provide an augmented reality interface that renders content items juxtaposed with a user's view of an environment (e.g., through a digital viewport, through a physical viewport, etc.). The content items can, for instance, be associated with one or more objects, locations, persons, etc. in the environment (e.g., a storefront, a road sign, a historical marker, etc.). Based on a rate at which the user is moving through or otherwise engaging with the environment, the content items can be rendered in an appropriate state of collapse or expansion. In this manner, for instance, the rendering of content items can be adapted to accommodate the speed with which the user is engaging with the content or the environment. For instance, when a user wearing a wearable device is jogging past a refreshment stand, the device may only render content in a collapsed content container indicating the availability of refreshments (e.g., a rendered icon of a water bottle). Upon sensing that the user is slowing on approach to the stand, the device can render additional details in an expanded content container (e.g., cost of water, other beverages, food, etc.). Similarly, such techniques can be used for heads-up displays in vehicles to indicates fuel or charging stations, on smart devices (e.g., smart watches) to render details of incoming messages, on billboards to adapt the detail of content to passing traffic speed, etc.

Example embodiments according to example aspects of the present disclosure can provide for a number of technical effects and benefits. For instance, in some embodiments, providing configurable rendering modes can provide for improved efficiency in using computational resources for presenting content. For instance, in some embodiments, a content page may contain a large number of content items through which a user may scroll. If the user only scrolls through an array of the content items quickly to scan the items at a high level, systems and methods according to the present disclosure can optimally provide sufficient detail for servicing a high-level scan while providing additional detail when needed, such as when the user slows to engage with a particular content item more deliberately. In this manner, for instance, the processing, memory usage, network bandwidth, etc. associated with fetching and rendering detailed content for each content item can be reduced or avoided.

Furthermore, in some embodiments, providing rate-adaptive rendering of content containers can provide for improved efficiency in rendering quickly changing interfaces. For instance, when rendering a list of content items (e.g., on a display, an audio transducer, etc.), quickly rendering each item on the list can require increased processing power, increased CPU or GPU utilization, increased memory cache, etc. By selectively rendering content in collapsed configurations based on a rate of engagement, example embodiments of the present disclosure can provide for reduced resource usage for quickly navigating interfaces having multiple content items.

Furthermore, in some embodiments, providing rate-adaptive rendering of content containers can provide for improved human-machine interfaces by accounting for the cognitive load of interacting with content based on a rate of engagement. For instance, human vision and cognition can only process a limited amount of data presented on an interface in a given amount of time. As a rate of engagement increases, the time to recognize and process presented information can decrease. In this manner, then, by selectively rendering content in collapsed content containers and expanded content containers, example embodiments of the present disclosure can provide an improved human-machine interface.

Furthermore, in some embodiments, providing rate-adaptive rendering of content containers can provide for improved human-machine interfaces by selectively decreasing or increasing a footprint for supplemental content items to optimize the use of limited rendering resources (e.g., limited display size, limited viewport size, etc.). For example, in some embodiments, a viewport can be used for multiple functionalities (e.g., a wearable glasses lens providing augmented reality content as well as providing visibility of real-world environments, a device screen displaying primary content in addition to supplemental content, etc.). A viewport may have limited footprint or display area for rendering supplemental content. Such supplemental content can expand the capabilities and utilities of the respective computing device(s). In this manner, for example, optimizing the configuration of rendering of such content can improve the overall functionality and utility of the computing device itself by optimizing the use of limited rendering resources.

With reference now to the Figures, example embodiments of the present disclosure will be discussed in further detail.

Example Devices and Systems

Figure 1B:
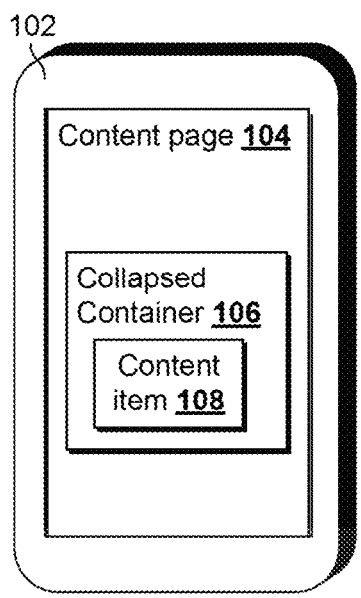
FIG. 1B depicts an illustration of an example device for implementing rate-adaptive content containers according to example embodiments of the present disclosure.
Figure 1C:
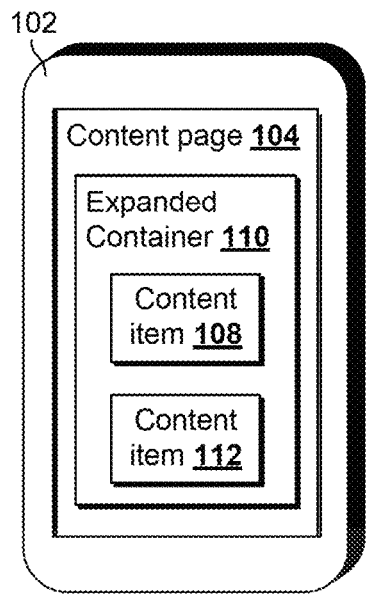
FIG. 1C depicts an illustration of an example device for implementing rate-adaptive content containers according to example embodiments of the present disclosure.

FIG. 1A depicts a block diagram of an example system for implementing rate-adaptive content containers according to example aspects of the present disclosure. One or more client computing devices 2 can be in communication with a content database computing system 80 for fetching and loading content items for rendering for a user of the client computing device(s) 2. FIGS. 1B and 1C variously illustrate embodiments of a display device 102 on which a content page 104 can display content (e.g., local content, external content, such as from content database computing system 80) rendered using collapsed containers and expanded containers, respectively.

With reference to FIG. 1A, the client computing device 2 can be any type of computing device, such as, for example, a mobile computing device (e.g., smartphone or tablet), a personal computing device (e.g., laptop or desktop), a workstation, a cluster, a gaming console or controller, a wearable computing device, an embedded computing device, or any other type of computing device. In some embodiments, the computing device 2 can be a client computing device. The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations (e.g., to obtain or render content as described herein, etc.).

In some embodiments, the client computing device(s) 2 can store or obtain one or more data structure(s) 20 for organizing, executing, rendering, or otherwise processing one or more content item(s) 22. For instance, a data structure 20 can include a web page, an application interface, a document (e.g., an offline or online document, such as a downloaded book, article, etc.), a recording (e.g., an audio or visual recording, such as a video, podcast, etc.), and the like.

In some embodiments, the data structure 20 can be configured for organizing a plurality of content item(s) 22. For instance, a data structure 20 can be configured for rendering a collection of content item(s) 22, such as a list, gallery, grid, sequence, etc.

In some embodiments, a data structure 20 can be configured for rendering one or more content item(s) 22 as supplemental content to some other primary content. For instance, the data structure 20 can include primary content in one or more primary content containers and supplement content item(s) 22 in one or more rate-adaptive content containers according to example aspects of the present disclosure.

In some examples, in some embodiments, the primary content can include a text article (e.g., a news article). Supplemental content item(s) 22 can include portions of other related news articles (e.g., headlines, snippets, etc.). Supplemental content item(s) 22 can be included interspersed within the text article, at the end of the text article, in a sidebar, etc.

In some examples, in some embodiments, primary content can include search results on a search results web page. Supplemental content item(s) 22 can include other related results suggested based on related queries.

In some examples, in some embodiments, primary content can include a podcast or other audio recording. Supplemental content item(s) 22 can include audio snippets (e.g., referencing other materials, such as other podcasts, websites, etc.) interspersed within the audio recording, at the end of the audio recording, at the beginning, etc.

In some examples, in some embodiments, primary content can include a home screen or other main interface of a device or system (e.g., a watch face, a dashboard, a control panel, etc.). Supplemental content item(s) 22 can include additional content relating to other functionality of the device or system. For instance, a smart watch may have a primary content of a watch face rendered on the screen, and supplemental content item(s) 22 can include notifications of incoming messages, alerts, schedules, directions, prompts, etc.

In some examples, in some embodiments, primary content can include a viewport to a real-world environment (e.g., digital viewport, physical viewport, etc.). Supplemental content item(s) 22 can be provided for augmenting the view of the real-world environment through the viewport. For instance, content item(s) 22 can be rendered as overlaid or otherwise juxtaposed with the view of the real-world environment.

Such examples are provided for sake of illustration only and are not to be understood as limiting the scope of the disclosure.

In some embodiments, the data structure 20 can be configured to render the content item(s) 22 in one or more rate-adaptive content containers according to example aspects of the present disclosure. For instance, a content container can include a subdivision of a data structure 20 which stores, executes, calls, or manipulates the content item(s) 22. For instance, a content container can include an object (e.g., an object defined in code, markdown language, etc.) that can be assigned properties, such as dimensions in space or time. For instance, a content container can include a component defining a bounded region of a rendered interface (e.g., a bounded portion of a display interface, a portion of an output audio signal, etc.).

In some embodiments, the content item(s) 22 can include various types of content. For instance, the content item(s) 22 can include interactive content or non-interactive content. For example, the content item(s) 22 can include audio content (e.g., recorded, synthesized, mixed, etc.), visual content (e.g., symbols, text, image(s), video, whether recorded or synthesized, etc.), more accessible transformations thereof (e.g., into braille, etc.), and the like. In some embodiments, audio content can include verbal content, such as rendered speech content (e.g., radio, text-to-speech, neural-network generated speech, etc.).

In some embodiments, the content item(s) 22 can include one or more executable components. For instance, an executable component can include executable instructions to retrieve additional content (e.g., supplemental content related to primary content). In some embodiments, an executable component can include a software component, such as an application or a portion thereof. For instance, a content item(s) 22 can include an interactive application experience, such as a game, service provider interface, content browsing interface, etc. for instance, the content item(s) 22 can include a browser component.

In some embodiments, the content item(s) 22 can be obtained from a content database computing system 80. The content database computing system 80 can include one or more processors 82 and a memory 84. The one or more processors 82 can be any suitable processing device (e.g., a processor core, a microprocessor, an ASIC, an FPGA, a controller, a microcontroller, etc.) and can be one processor or a plurality of processors that are operatively connected. The memory 84 can include one or more non-transitory computer-readable storage media, such as RAM, ROM, EEPROM, EPROM, flash memory devices, magnetic disks, etc., and combinations thereof. The memory 84 can store data 86 and instructions 88 which are executed by the processor 82 to cause the content database computing system 80 to perform operations. In some embodiments, the content database computing system 80 contains, manages, or otherwise has access to one or more content items 90 in a content database. In some embodiments, the content item(s) 22 can be selected from the content item(s) 90. For instance, in some embodiments, the content item(s) 22 can be selected from the content item(s) 90 using a real-time content selection process. In some embodiments, the content item(s) 22 can be selected from the content item(s) 90 based on a relevance of the content item(s) 22 to other content of the data structure(s) 20 (e.g., primary content) or based on a relevance of the content item(s) 22 to an identifier associated with the client computing device(s) 2.

In some embodiments, one or more configuration parameters of a rate-adaptive content container (e.g., for rendering the content item(s) 22) can be determined based on one or more input signals 24. An input signal 24, in some embodiments, can include a user input (e.g., a tap, a click, a button press, a voice input, etc.). In some embodiments, the input signal(s) 24 can include environmental or contextual inputs (e.g., a location, an elevation, a proximity or other device(s), a connection status, etc.). In some embodiments, the input signal(s) 24 can include incidental inputs (e.g., a velocity or acceleration caused by the motion of a user carrying the device, etc.). The input signal(s) 24 can be obtained from a number of sensors, devices, or systems, which may optionally be onboard the client computing device(s) 2. For instance, some example signal(s) can be obtained from communication interfaces, such as over a network or via local communications from other devices. Some example signals(s) can be obtained from onboard sensors, such as inertial sensors, GPS sensors, audio transducers, etc.

In some embodiments, one or more rate parameter(s) 26 can be determined based on the input signal(s) 24. A rate parameter 26 can indicate a user's rate of engagement with content rendered by the client computing device(s) 2. For instance, a rate parameter 26 can indicate a rate of a user's interaction with data structure(s) 20 or content item(s) 22 (e.g., scrolling through a content page, rate of motion with respect to location anchors of the content item(s) 22 in an augmented reality environment, etc.). In some examples, a rate can be based on a change in input signal(s) 24 (e.g., change in location of spatial inputs, such as multiple taps, movement of a cursor, successive GPS values, etc.). In some examples, a rate need not be based on a change in input signal(s) 24. For instance, a rate can be based on a capture of one or more input signals 24 at one point in time. In some embodiments, a rate can be predicted based on one or more input signal(s) 24 (e.g., using one or more machine-learned models).

FIG. 1B illustrates an example display interface 102 rendering a content page 104 on which a content item 108 is rendered within a container 106. For instance, the container 106 can be configured according to a collapsed configuration.

By way of comparison, FIG. 1C illustrates an example display interface 102 rendering a content page 104 using a container 110 that contains the content item 108 and another content item 112. For instance, the container 110 can be configured according to an expanded configuration. Although illustrated with two content items 108 and 112, it is to be understood that the container 110 according to the expanded configuration can contain a single larger content item 108, additional portions of content item 108, multiple content items in addition to content item 108, etc.

For instance, in some embodiments, in a collapsed container content item 108 could provide a sampling of content associated with the content item 108. For instance, a head-line, a tagline, a slogan, an icon, etc. Based on the input signal(s) 24 and the rate parameter(s) 26, the container 110 could provide an expanded view of the content item 108, optionally including additional related content via content item 112.

In some embodiments, content is fetched for rendering in the expanded configuration based on the determination to provide the expanded content container 110. In this manner, for instance, just-in-time retrieval and rendering can facilitate the efficiencies and improvements noted above.

For example, in some embodiments, one or more portions of content item 108 can be cached or queued on client computing device 2. Initially, for instance, the content item 108 can be rendered by the display device (e.g., of the client computing device 2) in the collapsed container 106. Based on the input signal(s) 24 and the rate parameter(s) 26, the content item 108 can be rendered in the expanded container. Additional content item 112 can also be retrieved at that time for presentation.

In this manner, for instance, additional content need not be retrieved until rendering resources are made available in the content container to render the additional content. Since the expansion of the container can be associated with a user interest in the content within the container, example embodiments can also provide for improved retrieval of more relevant content items to the tasks being performed.

For example, in some embodiments additional content can be retrieved from an external source (e.g., a third party system). For example, additional or supplemental content items can be retrieved from a content database computing system 80 that hosts content items 90. In some embodiments, the additional or supplemental content can be obtained from a different computing system than primary content presented with the additional or supplemental content. For instance, primary content can be obtained from a first party system (e.g., a first party content provider) and additional or supplemental content items can be obtained from another system (e.g., a third party content provider). In some embodiments, first party content can be rendered in the content containers in the collapsed configuration. Responsive to determining a value of the second rate parameter, content can be fetched from the external source for populating a content container in the expanded configuration.

When a content page 104 contains multiple content items in multiple respective containers, instead of querying the content database computing system 80 for each content item, systems and methods according to the present disclosure provide for querying content database computing system 80 based on (e.g., responsive to) a particular expansion of a particular container. In this manner, the content item(s) to be supplemented is known with more particularity (e.g., the content items in the collapsed container that was expanded). This can improve the relevance of additional content items provided for rendering, as well as decreasing unnecessary communication overhead for querying, retrieving, and transmitting additional content items that may never be rendered.

Figure 2A:
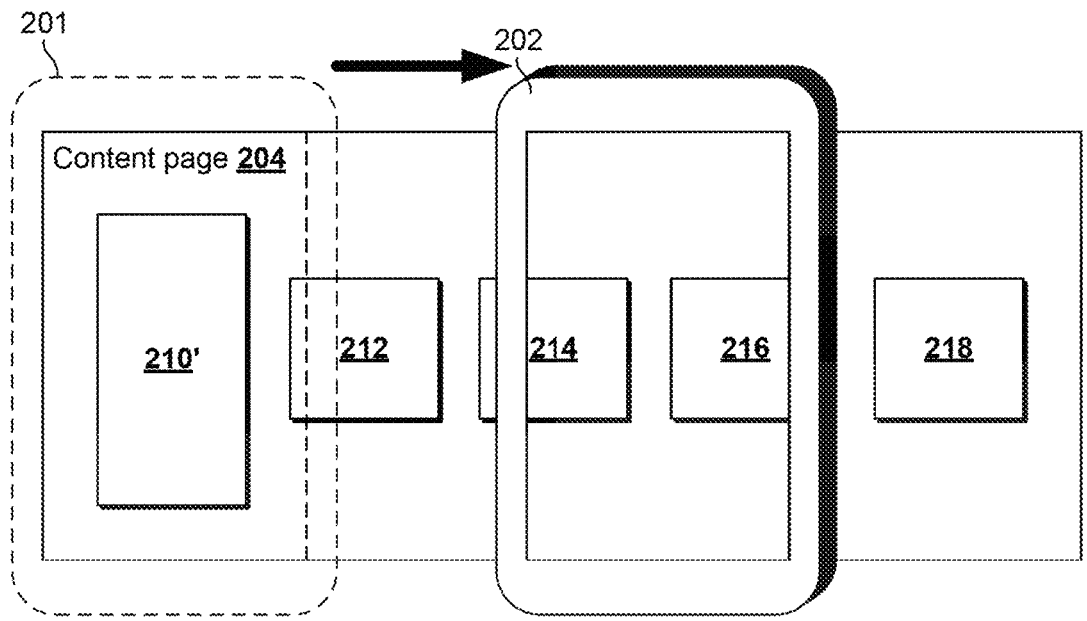
FIG. 2A depicts an illustration of an example system for implementing rate-adaptive content containers according to example embodiments of the present disclosure.
Figure 2B:
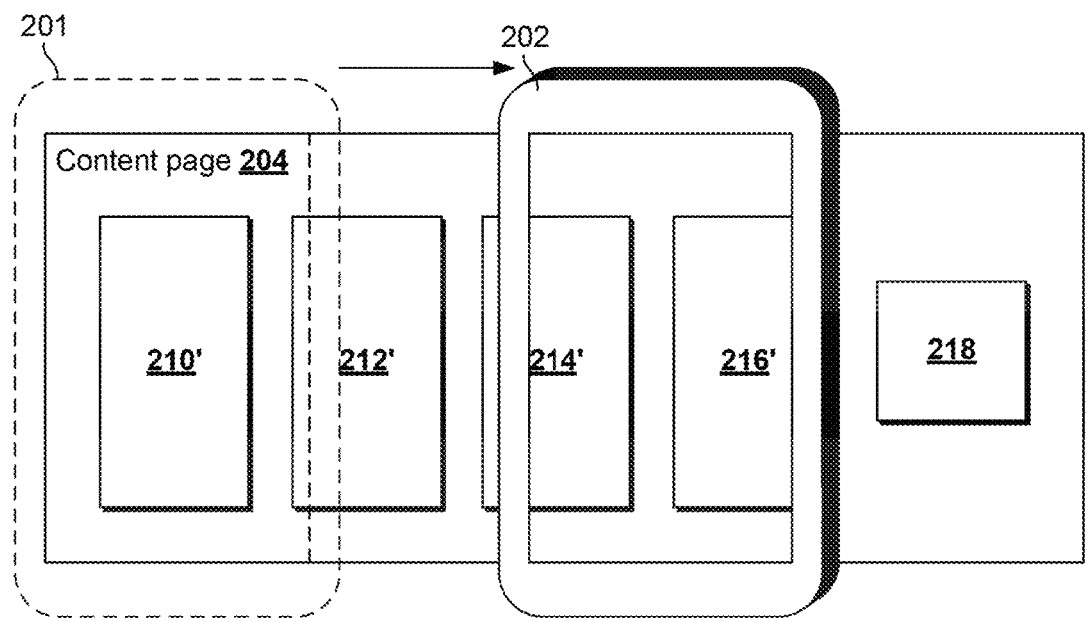
FIG. 2B depicts an illustration of an example system for implementing rate-adaptive content containers according to example embodiments of the present disclosure.

FIGS. 2A and 2B illustrate one example embodiment of an example device implementing rate-adaptive content containers according to the present disclosure. For example, a display device 202 can be used as a display interface for rendering a content page 204. The content page 204 is configured with a scrollable interface, illustrated here in an unfurled arrangement such that "scrolling" the content page 204 is analogous to sliding the viewport of the display device 202 over the content page. For instance, a movement of the viewport from original position 201 can correspond to left-to-right scroll across the content page 204.

The content page 204 can contain one or more content containers containing one or more content items. For instance, the content page 204 can contain a list or gallery of content containers for browsing the content items. The content containers can be arranged in any suitable arrangement or format. The content page 204 can be a web page, a native interface of an application, etc. For instance, the content page 204 can include search results, a news feed, a social media stream, a gallery of photos, etc.

In FIG. 2A, for example, the original position 201 of the viewport was centered on a first content container 210'. Optionally, the content container 210' could be in an expanded configuration if the viewport was dwelling on or remaining over the content container 210', potentially indicating a slower rate of engagement with the content page 204. Optionally, the content container 210' could be initialized in an expanded configuration to provide additional detail for the first look at the content page 204.

FIG. 2A depicts a strong (quick) scrolling action of the display device 202 away from the initial position 201 (intensity of scroll action indicated with line weight of arrow). The scrolling action can be triggered by or responsive to one or more inputs associated with the display device (e.g., input to the display device, input to a connected device, etc.). For instance, in some embodiments, an input can include a swiping gesture across a touch-sensitive surface of the display device to "drag" the content page 204 left, causing to viewport to scroll right.

One or more rate parameters can be determined based on the inputs. For instance, a rate parameter can correspond to a velocity or acceleration of the scroll action. For instance, an input gesture velocity can be determined based on position(s) of the input coordinates over time. In some embodiments, a rate parameter can correspond to a velocity or acceleration of the content page 204 in response to the scroll action. For instance, the motion of the content page 204 may be simulated with momentum, etc. to provide for various scrolling experiences. In this manner, for instance, a rate parameter of the content page 204 may be determined to be different from a rate parameter of the input(s).

As the content page 204 scrolls through the viewport of the display device 202, the content containers 212, 214, and 216 can pass through the viewport and are rendered on the display device 202. Because the scrolling action was quick, the content containers 212, 214, and 216 can be presented in content containers according to the collapsed configuration based on one or more rate parameter(s) associated with the scrolling action. The content container 218 can optionally be initialized in a collapsed configuration.

FIG. 2B illustrates an alternative scenario in which the scrolling action is slower. As the viewport slowly pans over the content page 204, the content containers 212', 214', and 216' can be presented in an expanded configuration. Due to the slow scroll action, the rate parameter(s) can trigger expansion of the content containers for display of additional content (e.g., larger content items, additional content items, etc.).

Figure 2C:
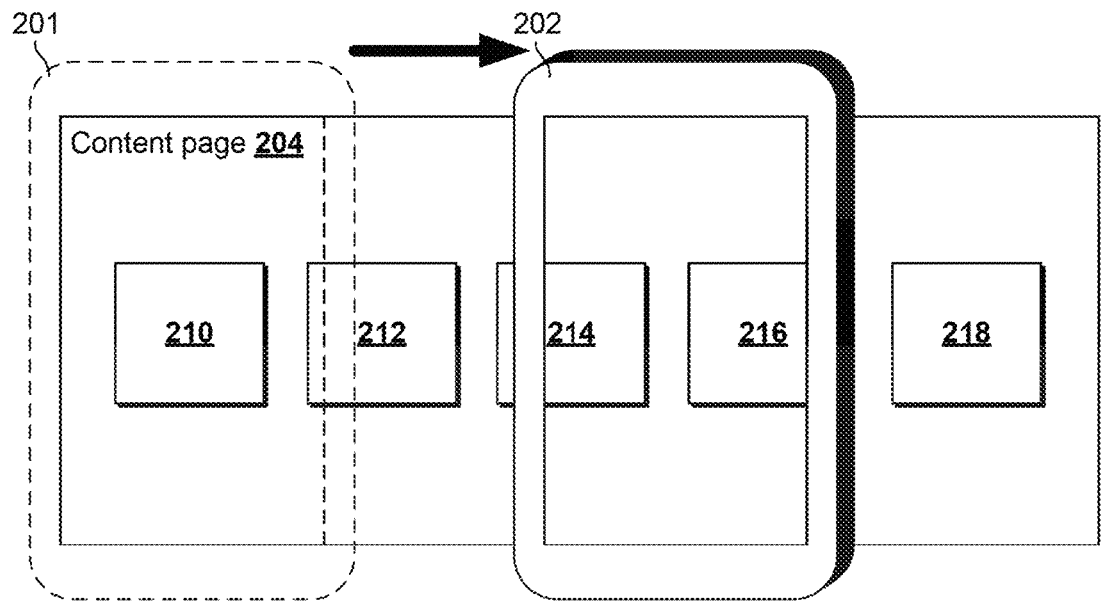
FIG. 2C depicts an illustration of an example system for implementing rate-adaptive content containers according to example embodiments of the present disclosure.
Figure 2D:
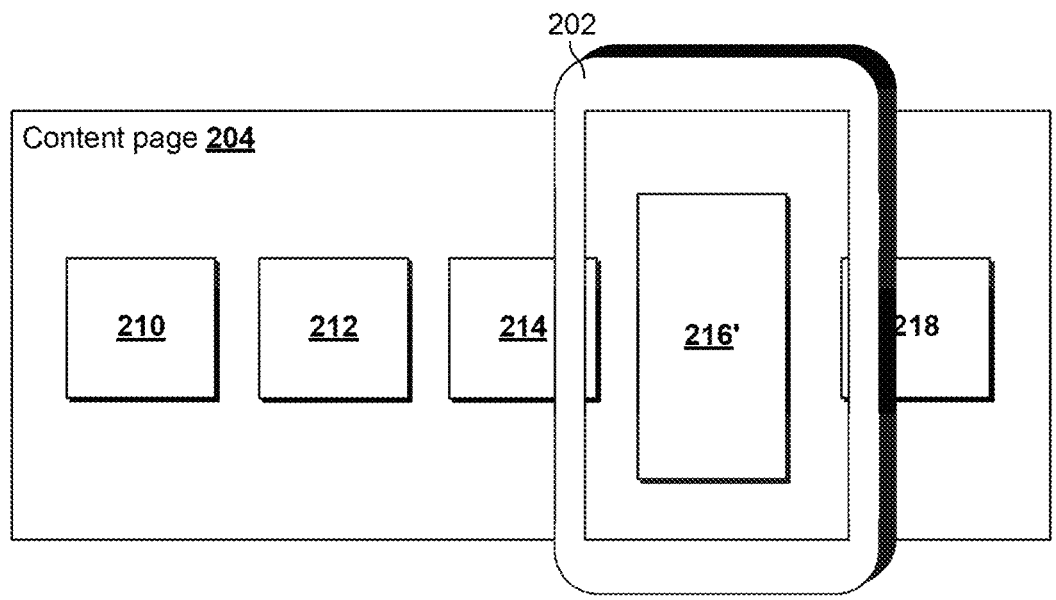
FIG. 2D depicts an illustration of an example system for implementing rate-adaptive content containers according to example embodiments of the present disclosure.

FIGS. 2C and 2D illustrate aspects of how changes in a rate of engagement can affect a rendering of a content container. For instance, in FIG. 2C, a content page 204 can be quickly scrolled. Based on the rate of the scrolling action, rate parameter(s) can be determined that cause the content items 210, 212, 214, and 216 to be rendered (at least initially) in a collapsed configuration for rapid perusal.

In FIG. 2D, the content page 204 has come to rest in the viewport of the display device 202 with content container 216' in focus. As shown, the content container 216' can be rendered in the expanded configuration because the scroll rate has changed. For instance, in FIG. 2C a first rate parameter could be determined indicating a first rate of engagement with the content page 204 that triggers rendering of one or more of the content containers according to a first configuration (e.g., the collapsed configuration). And in FIG. 2D, a second rate parameter can be determined indicating a second rate of engagement with the content page 204 (e.g., a slower rate of engagement) that triggers rendering of one or more of the content containers according to a second configuration (e.g., the expanded configuration). In some embodiments, various rate parameter(s) can refer to different measurements or calculations of different subject phenomena or different measurements or calculations of the same subject phenomenon (e.g., at different points in time).

In some embodiments, the rate of engagement can vary based on updated inputs. For instance, a first scroll input can be received that triggers quick scrolling action at a first time (e.g., as in FIG. 2C), but then a second scroll input can be received that triggers a reduced scrolling action (e.g., no scroll movement) at a second time, such that the viewport comes to rest as in FIG. 2D.

In some embodiments, the rate of engagement can vary based on predetermined engagement trajectories. For instance, in some embodiments, a content page 204 can be rendered with a scrollable interface simulated with physical properties such as mass, friction, etc. In this manner, for instance, a scroll rate of the content page 204 can start initially at a first rate parameter indicating a rapid scroll and decay to a second rate parameter indicating a slower scroll or no scroll.

Figure 2E:
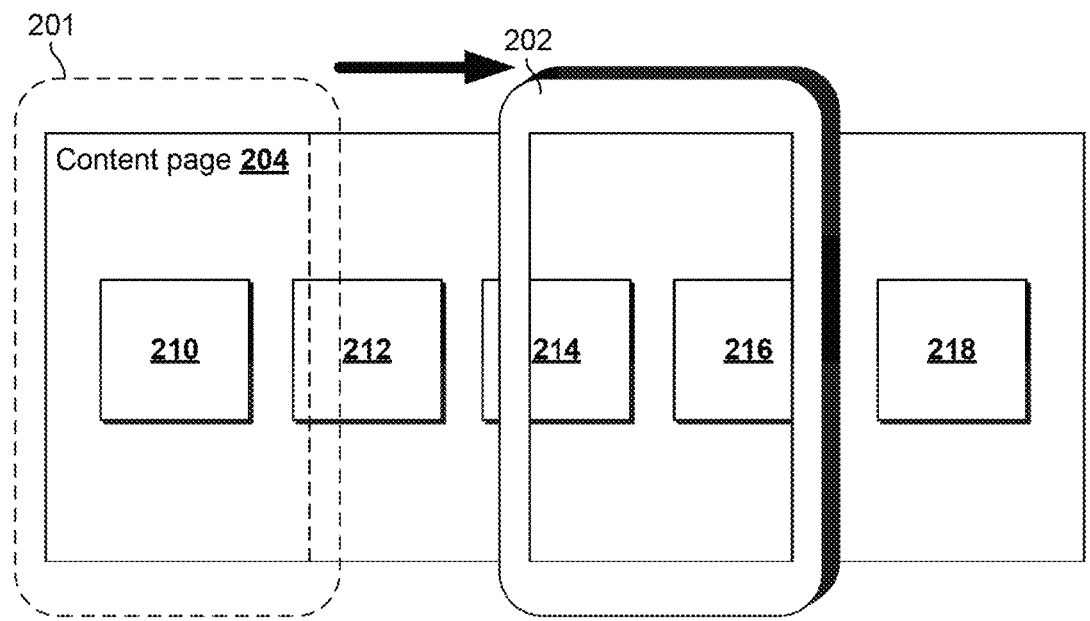
FIG. 2E depicts an illustration of an example system for implementing rate-adaptive content containers according to example embodiments of the present disclosure.
Figure 2F:
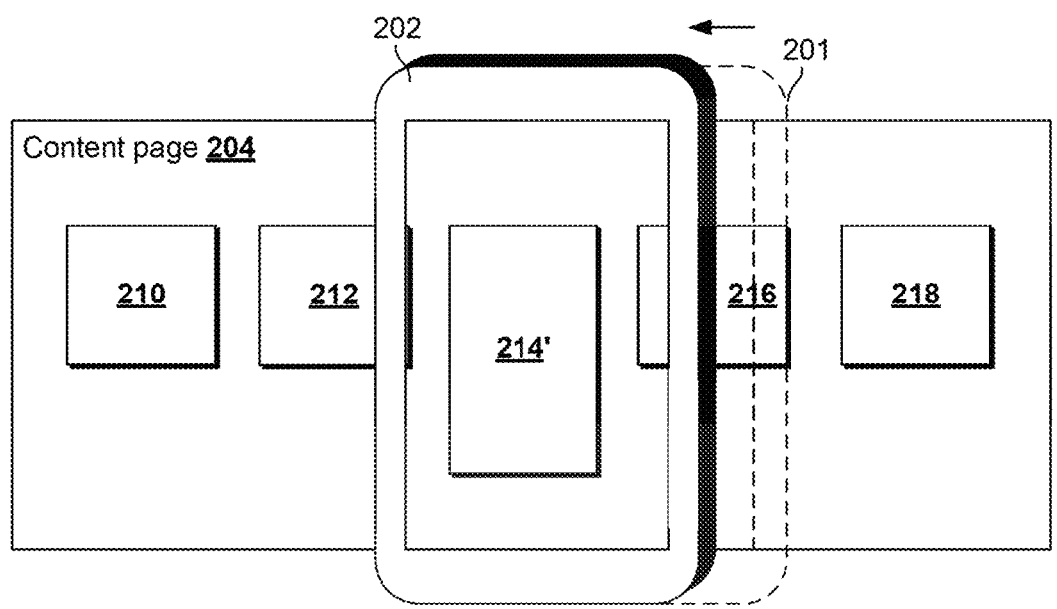
FIG. 2F depicts an illustration of an example system for implementing rate-adaptive content containers according to example embodiments of the present disclosure.

FIGS. 2E and 2F depict another scenario that illustrates how the rate of engagement can be determined based on a change in direction indicated by one or more rate parameters. For instance, in FIG. 2E, a content page can be quickly scrolled. As the content containers 210, 212, 214, and 216 are respectively passing through the viewport of the display device 202, a user can be viewing and scanning the content item(s) presented in the collapsed configurations of the content containers 212, 214, and 216.

As shown in FIG. 2F, however, a scroll action can be performed (e.g., based on one or more inputs) to reverse the direction of the scroll to revisit one of the content containers, content container 214. Based on the change in the rate of engagement with content container 214, the container can be rendered as expanded content container 214' to present the content item(s) within, as well as any additional content items retrieved for presentation therewith.

Figure 3A:
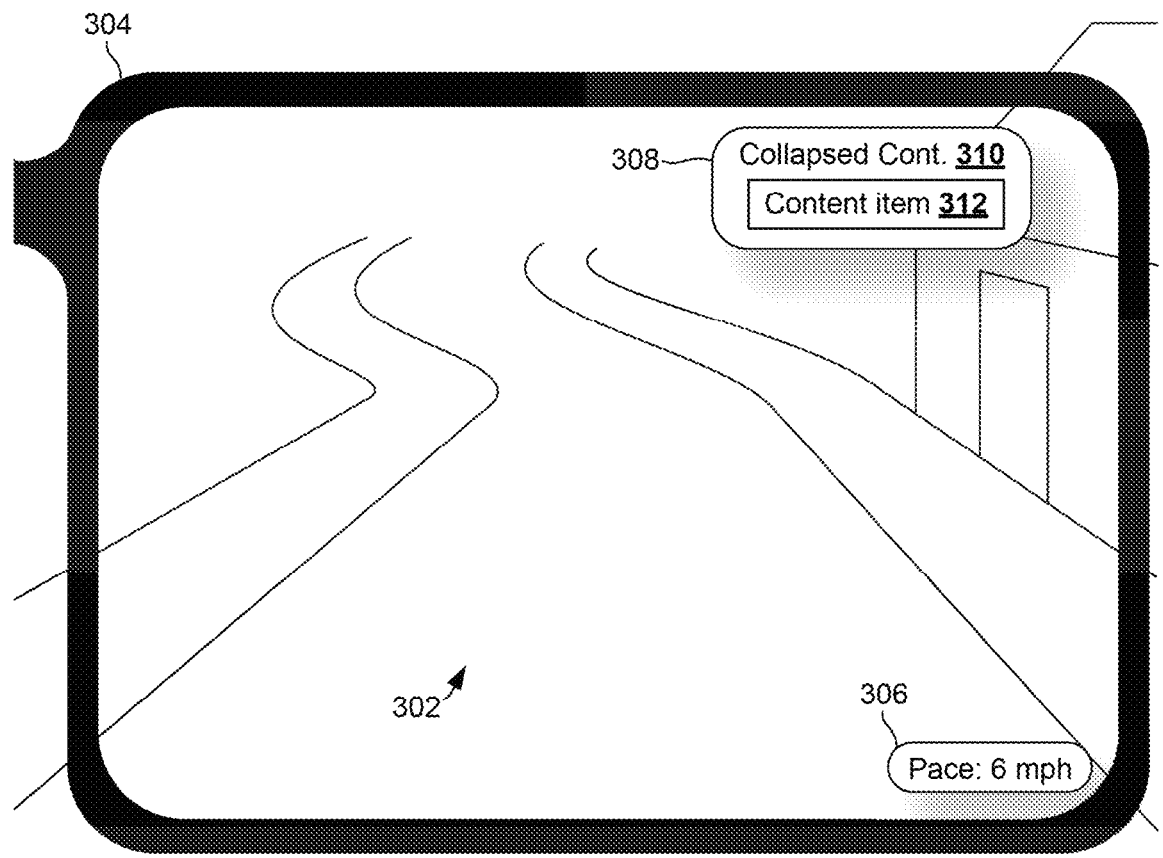
FIG. 3A depicts an illustration of an example system for implementing rate-adaptive content containers according to example embodiments of the present disclosure.
Figure 3B:
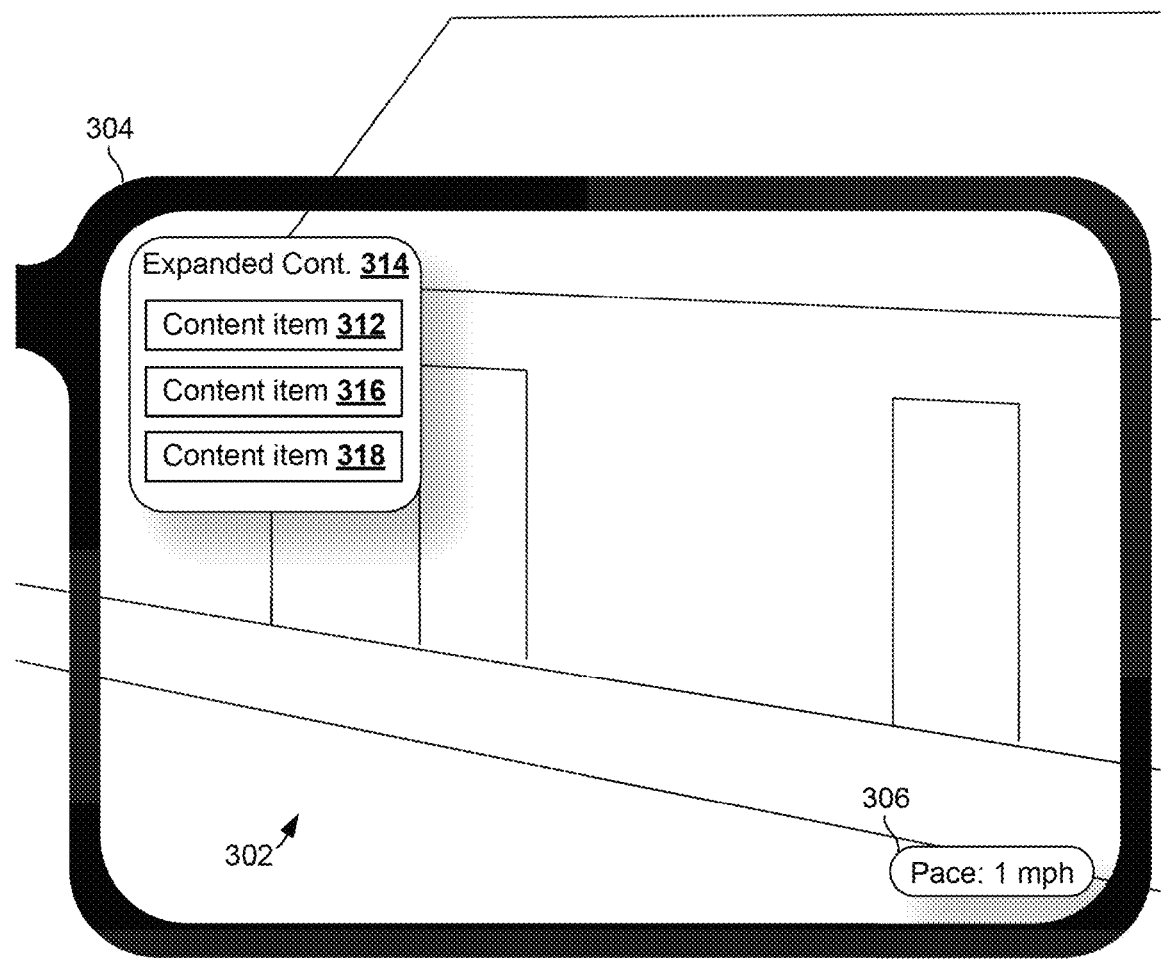
FIG. 3B depicts an illustration of an example system for implementing rate-adaptive content containers according to example embodiments of the present disclosure.

FIGS. 3A and 3B illustrate how a rate of engagement can be implemented in a variety of contexts in addition or alternative to scrollable interfaces. For example, an augmented reality system 300 deployed in a real-world environment 302 can include using a wearable device 304 (e.g., wearable glasses, a watch, a viewport of a camera or mobile app, etc.) to view the real-world environment 302 and render information overlays to augment the view. Although the example in FIGS. 3A and 3B is discussed in terms of augmented reality, it is to be understood that the same techniques can be applied in a virtual reality context as well.

For example, a wearer of the wearable device 304 can be jogging through the environment 302. For instance, a pace overlay can indicate that the wearer is jogging at a pace of 6 miles per hour. The wearable device 304 render useful information about the environment 302. For instance, as the wearer passes the structure on the right, a content overlay 308 can be provided about the structure or services or products offered within. Because the wearer is jogging and may not want to be distracted by exhaustive information in the overlay, or may want to retain maximal visibility through the viewport to see the environment 302, the content overlay 308 can include a collapsed content container 310 containing content item 312. For instance, the wearable device 304 can detect a pace of the wearer based on one or more input signals (e.g., GPS signals, communications from another GPS-enabled device, etc.). Based on the input signals, a rate parameter can be determined to be above a threshold. Based on the rate parameter being above the threshold, the content container 310 can be presented in the collapsed configuration. For example, the content overlay 308 can include content descriptive of available refreshments (e.g., water). For instance, the wearable device 304 can select and present the content overlay 308 based on the context of the use of the wearable device 304 (e.g., exercise).

As shown in FIG. 3B, the wearer may slow in pace (e.g., to 1 mph) and turn to directly gaze at the structure. For instance, the wearer may be interested in the information presented in the content overlay 308 (e.g., for obtaining refreshments). The wearable device 304 can detect a rate parameter (e.g., a slowed pace, etc.). The wearable device 304 can also obtain one or more input signals indicating or suggesting a reaction to the content overlay, such as a turned head, directed gaze, etc. Based on the input signal(s), the wearable device 304 can render an expanded content container 310' containing the content item 312 and additional content, such as content items 314 and 316.

In some embodiments, a rate of engagement can be determined in conjunction with an application operating on a user device. For instance, an application can execute on a user device for processing and optionally displaying data received from an image sensor. For instance, the application can include an image application providing a digital viewport for viewing a live view of the data streaming from the image sensor. The viewport can be panned across an environment (e.g., by pointing the image sensor at different focal points in the environment, etc.). One or more content containers can be rendered as an overlay in the viewpoint (e.g., similarly to FIGS. 3A and 3B). One or more rate parameter(s) can be determined based on a panning speed. In this manner, for instance, based on the rate parameter(s), the content container(s) can be rendered in collapsed or expanded configurations.

Figure 4A:
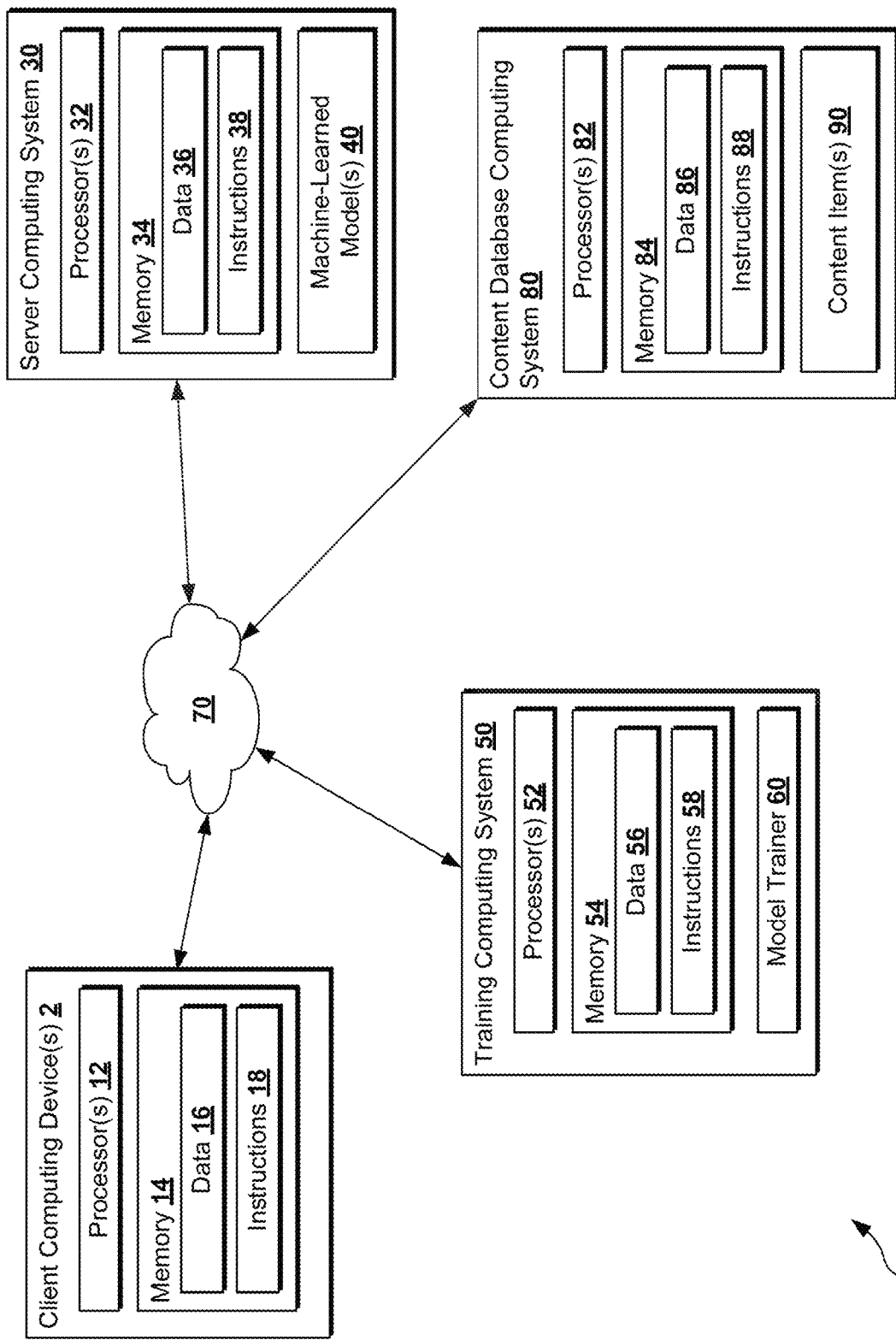
FIG. 4A depicts a block diagram of an example computing system that can implement rate-adaptive content containers according to example embodiments of the present disclosure.

FIG. 4A depicts a block diagram of an example computing system 1 that can perform according to example embodiments of the present disclosure. The system 1 includes a client computing device 2, a server computing system 30, and a training computing system 50 that are communicatively coupled over a network 70.

The client computing device 2 can be any type of computing device, such as, for example, a mobile computing device (e.g., smartphone or tablet), a personal computing device (e.g., laptop or desktop), a workstation, a cluster, a gaming console or controller, a wearable computing device, an embedded computing device, or any other type of computing device. In some embodiments, the computing device 2 can be a client computing device. The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations (e.g., to obtain or render content as described herein, etc.).

In some implementations, the user computing device 2 can store or include one or more machine-learned models 28. For example, the machine-learned models 28 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some embodiments, the machine-learned models 28 can be used to output one or input signal(s) (e.g., input signal(s) 24) or one or more rate parameters (e.g., rate parameters 26). In some embodiments, the machine-learned models 28 can be used for obtaining one or more content items for rendering in a rate-adaptive content container according to example aspects of the present disclosure. For instance, in some embodiments, machine-learned models 28 can be used to predict a relevance of (or predict a feature vector for querying for) one or more content items of content items 90.

In some implementations, one or more machine-learned models 28 can be received from the server computing system 30 over network 70, stored in the computing device memory 14, and used or otherwise implemented by the one or more processors 12. In some implementations, the computing device 2 can implement multiple parallel instances of a machine-learned model 28. In some embodiments, machine-learned model(s) 28 can perform personalization of one or more content items, or rendering thereof (e.g., surface selection or other rendering characteristics) for or on the client device 102, 2.

Additionally, or alternatively, one or more machine-learned models 40 can be included in or otherwise stored and implemented by the server computing system 30 that communicates with the computing device 2 according to a client-server relationship. For example, the machine-learned models 40 can be implemented by the server computing system 40 as a portion of a web service. For instance, the server computing system 30 can communicate with the computing device 2 over a local intranet or internet connection. For instance, the computing device 2 can be a workstation or endpoint in communication with the server computing system 30, with implementation of the model 40 on the server computing system 30 being remotely performed and an output provided (e.g., cast, streamed, etc.) to the computing device 2. Thus, one or more models 28 can be stored and implemented at the user computing device 2 or one or more models 40 can be stored and implemented at the server computing system 30.

The computing device 2 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 30 can include one or more processors 32 and a memory 34. The one or more processors 32 can be any suitable processing device (e.g., a processor core, a microprocessor, an ASIC, an FPGA, a controller, a microcontroller, etc.) and can be one processor or a plurality of processors that are operatively connected. The memory 34 can include one or more non-transitory computer-readable storage media, such as RAM, ROM. EEPROM, EPROM, flash memory devices, magnetic disks, etc., and combinations thereof. The memory 34 can store data 36 and instructions 38 which are executed by the processor 32 to cause the server computing system 30 to perform operations.

In some implementations, the server computing system 30 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 30 can store or otherwise include one or more machine-learned models 40. For example, the models 40 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). In some embodiments, machine-learned model(s) 40 can perform personalization of one or more content items, or rendering thereof (e.g., surface selection or other rendering characteristics) for the client device 102, 2.

The computing device 2 or the server computing system 30 can train example embodiments of a machine-learned model (e.g., including models 28 or 40). In some embodiments, the computing device 2 or the server computing system 30 can train example embodiments of a machine-learned model (e.g., including models 28 or 40) via interaction with the training computing system 50. In some embodiments, the training computing system 50 can be communicatively coupled over the network 70. The training computing system 50 can be separate from the server computing system 30 or can be a portion of the server computing system 30.

The training computing system 50 can include one or more processors 52 and a memory 54. The one or more processors 52 can be any suitable processing device (e.g., a processor core, a microprocessor, an ASIC, an FPGA, a controller, a microcontroller, etc.) and can be one processor or a plurality of processors that are operatively connected. The memory 54 can include one or more non-transitory computer-readable storage media, such as RAM, ROM, EEPROM, EPROM, flash memory devices, magnetic disks, etc., and combinations thereof. The memory 54 can store data 56 and instructions 58 which are executed by the processor 52 to cause the training computing system 50 to perform operations. In some implementations, the training computing system 50 includes or is otherwise implemented by one or more server computing devices.

Parameters of the model(s) can be trained, in some embodiments, using various training or learning techniques, such as, for example, backwards propagation of errors. For example, an objective or loss can be backpropagated through pretraining, general training, or finetuning pipeline(s) to update one or more parameters of the model(s) (e.g., based on a gradient of the loss function). Various determinations of loss can be used, such as mean squared error, likelihood loss, cross entropy loss, hinge loss, or various other loss functions. Gradient descent techniques can be used to iteratively update the parameters over a number of training iterations. In some implementations, performing backwards propagation of errors can include performing truncated backpropagation through time. The pipeline(s) can perform a number of generalization techniques (e.g., weight decays, dropouts, etc.) to improve the generalization capability of the models being trained.

The model trainer 60 can include computer logic utilized to provide desired functionality. The model trainer 60 can be implemented in hardware, firmware, or software controlling a general-purpose processor. For example, in some implementations, the model trainer 60 includes program files stored on a storage device, loaded into a memory, and executed by one or more processors. In other implementations, the model trainer 60 includes one or more sets of computer-executable instructions that are stored in a tangible computer-readable storage medium such as RAM, hard disk, or optical or magnetic media.

The network 70 can be any type of communications network, such as a local area network (e.g., intranet), wide area network (e.g., Internet), or some combination thereof and can include any number of wired or wireless links. In general, communication over the network 70 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

FIG. 4A illustrates one example computing system that can be used to implement the present disclosure. Other computing systems can be used as well. For example, in some implementations, the computing device 2 can include the model trainer 60. In such implementations, a training pipeline can be used locally at the computing device 2. In some of such implementations, the computing device 2 can implement the model trainer 60 to personalize the model(s) based on device-specific data.

Figure 4B:
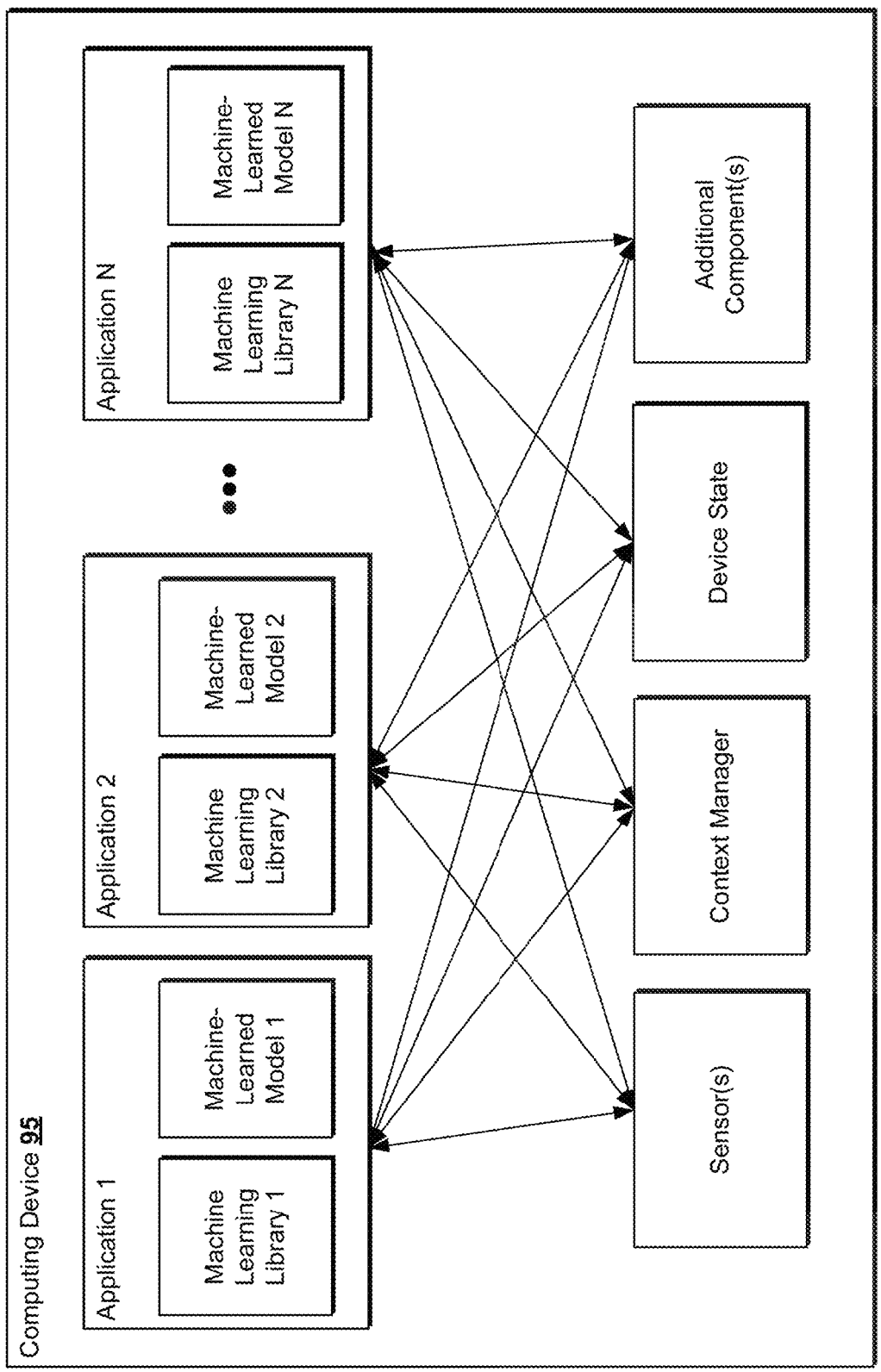
FIG. 4B depicts a block diagram of an example computing device that can implement rate-adaptive content containers according to example embodiments of the present disclosure.

FIG. 4B depicts a block diagram of an example computing device 80 that performs according to example embodiments of the present disclosure. The computing device 80 can be a user computing device or a server computing device. The computing device 80 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. Each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 4C:
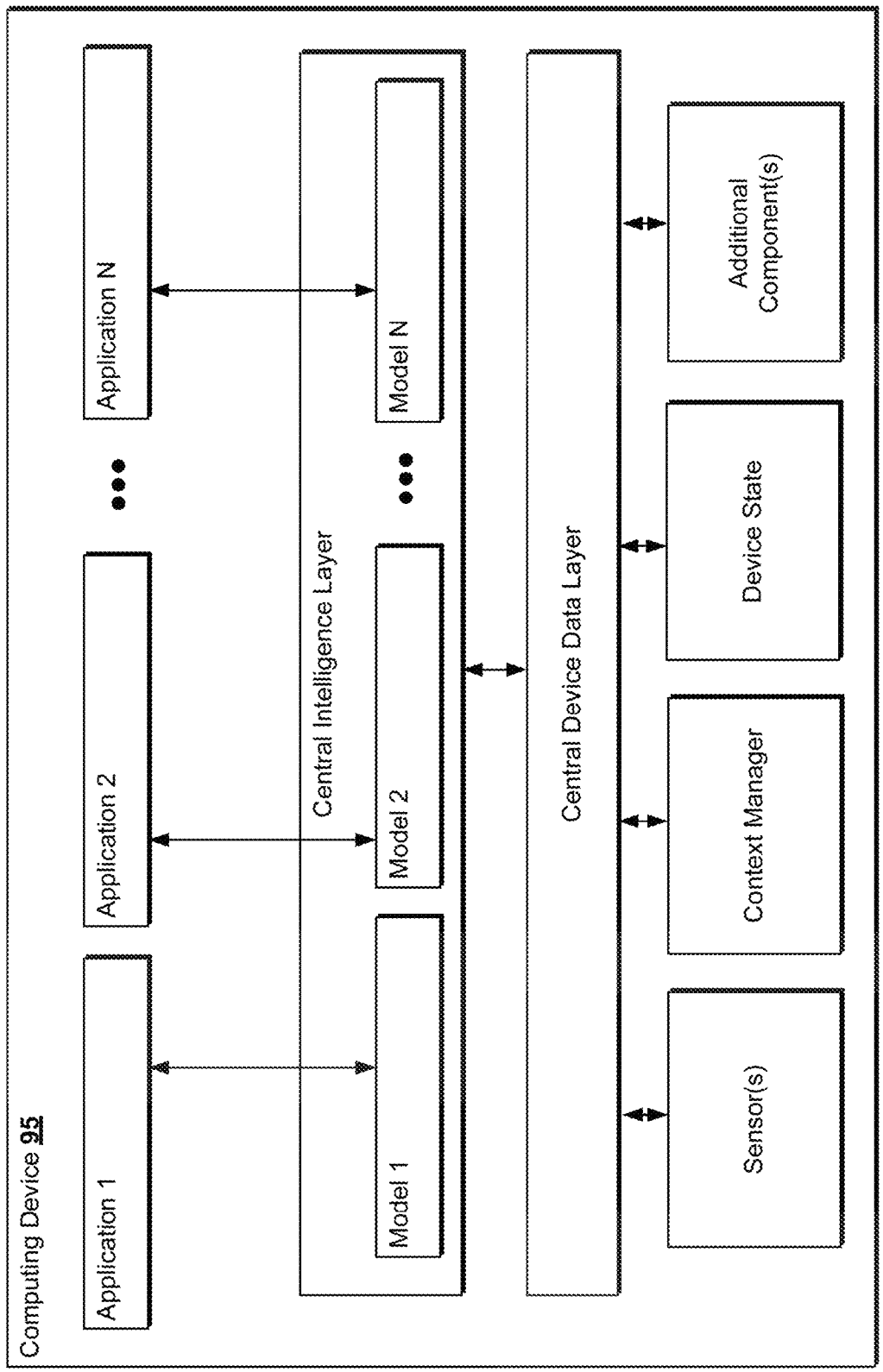
FIG. 4C depicts a block diagram of an example computing device that can implement rate-adaptive content containers according to example embodiments of the present disclosure.

FIG. 4C depicts a block diagram of an example computing device 80 that performs according to example embodiments of the present disclosure. The computing device 80 can be a user computing device or a server computing device. The computing device 80 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 4C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 80.

The central intelligence layer can communicate with a central device data layer. The central device data layer can be a centralized repository of data for the computing device 80. As illustrated in FIG. 4C, the central device data layer can communicate with a number of other components of the computing device, such as, for example, one or more sensors, a context manager, a device state component, or additional components. In some implementations, the central device data layer can communicate with each device component using an API (e.g., a private API).

Example Methods

Figure 5:
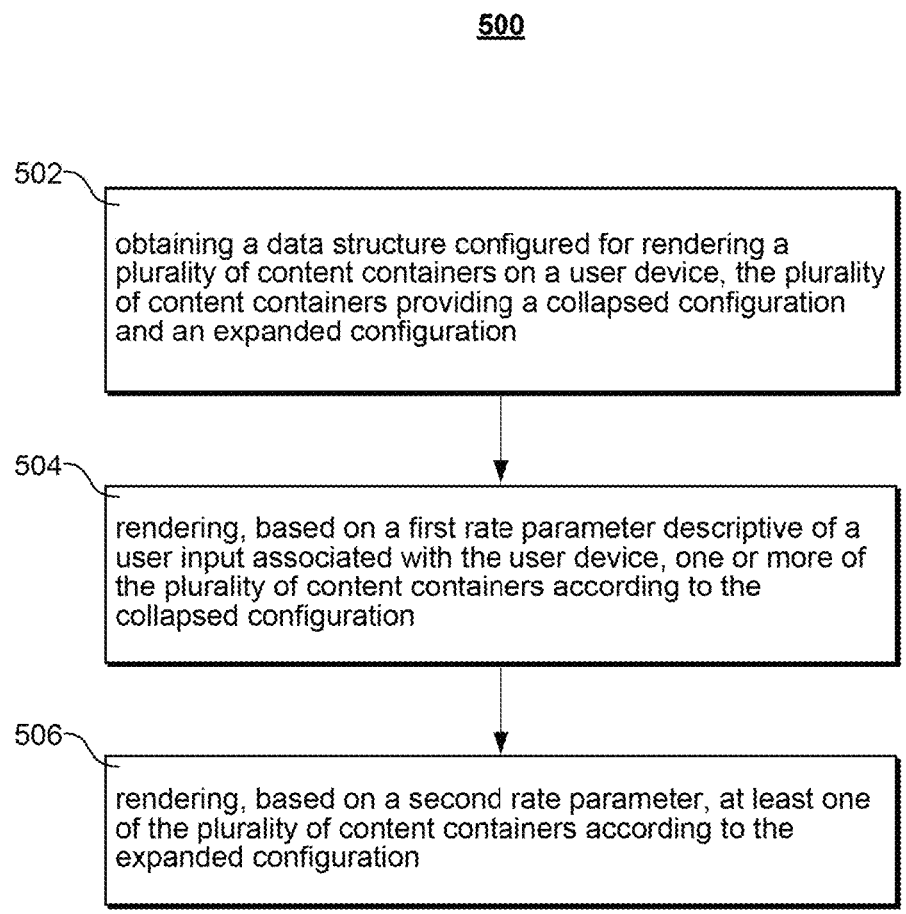
FIG. 5 depicts a flow chart diagram of an example method to implement rate-adaptive content containers according to example embodiments of the present disclosure.

FIG. 5 depicts a flow chart diagram of an example method 500 to perform according to example embodiments of the present disclosure. Although FIG. 5 depicts steps performed in a particular order for purposes of illustration and discussion, the methods of the present disclosure are not limited to the particularly illustrated order or arrangement. The various steps of the example method 500 can be omitted, rearranged, combined, and/or adapted in various ways without deviating from the scope of the present disclosure.

At 502, method 500 can include obtaining a data structure configured for rendering a plurality of content containers on a user device, the plurality of content containers providing a collapsed configuration and an expanded configuration. For instance, the data structure can be a web page, application interface, etc. The plurality of content containers can facilitate a user's interaction with or consumption of content items. For instance, the content containers can provide a scrollable interface for browsing lists of content items (e.g., list of news content items, product listing content items, etc.). The content containers can also provide supplemental content overlaid another interface.

At 504, method 500 can include rendering, based on a first rate parameter descriptive of a user input associated with the user device, one or more of the plurality of content containers according to the collapsed configuration. For instance, in some embodiments, the first rate parameter corresponds to a scroll speed. For instance, a user can scroll a scrollable interface for browsing the content items in the content containers. A user can provide a scroll input to the user device (e.g., swipe, etc.), and the user device can determine the first rate parameter based on a speed of the scroll input. In some embodiments, the method 500 can include rendering, on a displace device (e.g., on the user device, on a connected device, etc.) an animation of scrolling through the one or more of the plurality of content containers according to the collapsed configuration, the animated scrolling corresponding to the scroll speed. For instance, a user can quickly scroll through a number of content items rendered in containers in the collapsed configuration.

In some embodiments, the first rate parameter corresponds to a speed of motion of the user device relative to an environment of the user device. For instance, the user input can include sensor data from a sensor on the user device (e.g., a location sensor, an inertial sensor, etc.). In some embodiments, the first rate parameter corresponds to a panning speed of an image sensor of the user device.

At 506, method 500 can include rendering, based on a second rate parameter, at least one of the plurality of content containers according to the expanded configuration. For instance, a second rate parameter can be based on a second user input. For instance, while browsing the list of content items, the user could see a content item of interest and stop the scrolling action. Based on the stopping of the scrolling action, at least one of the plurality of content containers can be rendered in the expanded configuration (e.g., for providing additional content).

In some embodiments, the second rate parameter corresponds to a scroll speed decay rate. In some embodiments, the second rate parameter corresponds to an interrupting scroll speed of a second user input. In some embodiments, the interrupting scroll speed indicates a reverse scroll direction. In some embodiments, the interrupting scroll speed corresponds to a decreased scroll speed. In some embodiments, the interrupting scroll speed corresponds to a scroll stop event.

In some embodiments, the second rate parameter corresponds to a second, different speed of motion of the user device relative to the environment. For instance, the second rate parameter can correspond to a user moving more slowly in an environment (e.g., slowing in response to seeing content rendered in the content container). In some embodiments, the second rate parameter corresponds to a second, different panning speed of the user device.

In some embodiment, the user device comprises a wearable component. For instance, the wearable component can include wristwear (e.g., watch, etc.), headwear (e.g., glasses, etc.), clothing (e.g., smart clothing, etc.).

In some embodiments, the method 500 can include rendering first party content from a first server system in the one or more of the plurality of content containers according to the collapsed configuration, and rendering third party content from a second server system in the at least one of the one or more of the plurality of content containers according to the expanded configuration. In some embodiments, the third party content was fetched from the second server system responsive to determining the second rate parameter. In some embodiments, the method 500 can include transmitting, to the second server system, responsive to determining the second rate parameter, a request for additional content based on the first party content.

In some embodiments, the method 500 can include rendering a first set of third party content from a server system in the one or more of the plurality of content containers according to the collapsed configuration, and rendering a second set of third party content from the server system in the at least one of the one or more of the plurality of content containers according to the expanded configuration, wherein the second set comprises additional content relating to an element of the first set.

The following is a non-exhaustive list of aspects of the present disclosure:

Aspect 1. A computer-implemented method, comprising:
obtaining, by a computing system comprising one or more processors, a data structure configured for rendering a plurality of content containers on a user device, the plurality of content containers providing a collapsed configuration and an expanded configuration;
rendering, by the computing system and based on a first rate parameter descriptive of a user input associated with the user device, one or more of the plurality of content containers according to the collapsed configuration; and
rendering, by the computing system and based on a second rate parameter, at least one of the plurality of content containers according to the expanded configuration.

By providing the plurality of content containers in the collapsed configuration based on the first rate parameter, a user may be able to navigate a plurality of containers with ease. However, when the second rate parameter means that the containers a rendered in the expanded configuration, this may improve a user's ability to interact with the content. Essentially, the expanded content may provide a larger portion of a screen over which the user may interact with the content. A user interaction with the content may include selecting the content.

Aspect 2. The computer-implemented method of aspect 1, wherein the first rate parameter corresponds to a scroll speed.

Aspect 3. The computer-implemented method of aspect 2, comprising:
rendering, by the computing system and on a displace device, an animation of scrolling through the one or more of the plurality of content containers according to the collapsed configuration, the animated scrolling corresponding to the scroll speed.

Aspect 4. The computer-implemented method of any of the preceding aspects, wherein when a content container of the plurality of content containers is rendered according to the collapsed configuration a relatively low data version of the content is rendered in the content container and when a content container of the plurality of content containers is rendered according to the expanded configuration a relatively high data version of the content is rendered in the content container.

By providing a relatively low data version of the content to be rendered in the content container in the collapsed configuration and a relatively high data version of the content to be rendered in the content container in the expanded configuration, the method may allow for processing and/or data transmission requirements to be adapted or reduced in response to user behavior. For example, when the scrolling speed is high the rendering or data transmission requirements per content container may be reduced. When the scrolling speed is low or the user has scrolled back to engage with the content, the rendering and/or data transmission may be increased.

Aspect 5. The computer-implemented method of aspect 4 wherein the relatively low data version of the content is a low resolution or abridged version of the relatively high data version of the content.

Aspect 6. The computer-implemented method of any of the preceding aspects, wherein the second rate parameter corresponds to a scroll speed decay rate.

Aspect 7. The computer-implemented method of any of the preceding aspects, wherein the second rate parameter corresponds to an interrupting scroll speed of a second user input.

Aspect 8. The computer-implemented method of any of the preceding aspects, wherein the interrupting scroll speed indicates a reverse scroll direction.

Aspect 9. The computer-implemented method of any of the preceding aspects, wherein the interrupting scroll speed corresponds to a decreased scroll speed.

Aspect 10. The computer-implemented method of any of the preceding aspects, wherein the interrupting scroll speed corresponds to a scroll stop event.

Aspect 11. The computer-implemented method of any of the preceding aspects, comprising:
  rendering, by the computing system, first party content from a first server system in the one or more of the plurality of content containers according to the collapsed configuration; and
  rendering, by the computing system, third party content from a second server system in the at least one of the one or more of the plurality of content containers according to the expanded configuration.

Aspect 12. The computer-implemented method of aspect 11, wherein the third party content was fetched from the second server system responsive to determining the second rate parameter.

Aspect 13. The computer-implemented method of any of the preceding aspects, comprising:
  transmitting, by the computing system and to the second server system, responsive to determining the second rate parameter, a request for additional content based on the first party content.

Aspect 14. The computer-implemented method of any of the preceding aspects, comprising:
  rendering, by the computing system, a first set of third party content from a server system in the one or more of the plurality of content containers according to the collapsed configuration; and
  rendering, by the computing system, a second set of third party content from the server system in the at least one of the one or more of the plurality of content containers according to the expanded configuration, wherein the second set comprises additional content relating to an element of the first set.

Aspect 15. The computer-implemented method of any of the preceding aspects, wherein the first rate parameter corresponds to a speed of motion of the user device relative to an environment of the user device.

Aspect 16. The computer-implemented method of any of the preceding aspects, wherein the second rate parameter corresponds to a second, different speed of motion of the user device relative to the environment.

Aspect 17. The computer-implemented method of any of the preceding aspects, wherein the first rate parameter corresponds to a panning speed of an image sensor of the user device.

Aspect 18. The computer-implemented method of any of the preceding aspects, wherein the second rate parameter corresponds to a second, different panning speed of the user device.

Aspect 19. The computer-implemented method of any of the preceding aspects, wherein the user device comprises a wearable component.

Aspect 20. One or more non-transitory computer-readable storage media storing instructions that are executable to cause one or more processors to perform operations, the operations comprising the method of any of the preceding aspects.

Aspect 21. A system comprising the one or more non-transitory computer-readable storage media of aspect 20, the system further comprising the one or more processors.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of". "any combination of" example elements listed therein, etc. Also, terms such as "based on" should be understood as "based at least in part on."

What is claimed is:

1. A computer-implemented method, comprising:
  obtaining, by a computing system comprising one or more processors, a data structure configured for rendering a plurality of content containers on a user device, the plurality of content containers providing a collapsed configuration and an expanded configuration;
  rendering, by the computing system and based on a first rate parameter descriptive of a user input associated with the user device, one or more of the plurality of content containers according to the collapsed configuration;

rendering, by the computing system, first party content from a first server system in the one or more of the plurality of content containers according to the collapsed configuration;
  rendering, by the computing system and based on a second rate parameter, at least one of the plurality of content containers according to the expanded configuration; and
  rendering, by the computing system, third party content from a second server system in the at least one of the one or more of the plurality of content containers according to the expanded configuration.

2. The computer-implemented method of claim 1, wherein the first rate parameter corresponds to a scroll speed.

3. The computer-implemented method of claim 2, comprising:
  rendering, by the computing system and on a displace device, an animation of scrolling through the one or more of the plurality of content containers according to the collapsed configuration, the animated scrolling corresponding to the scroll speed.

4. The computer-implemented method of claim 1, wherein the second rate parameter corresponds to a scroll speed decay rate.

5. The computer-implemented method of claim 1, wherein the second rate parameter corresponds to an interrupting scroll speed of a second user input.

6. The computer-implemented method of claim 5, wherein the interrupting scroll speed indicates a reverse scroll direction.

7. The computer-implemented method of claim 5, wherein the interrupting scroll speed corresponds to a decreased scroll speed.

8. The computer-implemented method of claim 5, wherein the interrupting scroll speed corresponds to a scroll stop event.

9. The computer-implemented method of claim 1, wherein the third party content was fetched from the second server system responsive to determining the second rate parameter.

10. The computer-implemented method of claim 1, comprising:
  transmitting, by the computing system and to the second server system, responsive to determining the second rate parameter, a request for additional content based on the first party content.

11. The computer-implemented method of claim 1, wherein the first rate parameter corresponds to a speed of motion of the user device relative to an environment of the user device.

12. The computer-implemented method of claim 11, wherein the second rate parameter corresponds to a second, different speed of motion of the user device relative to the environment.

13. The computer-implemented method of claim 1, wherein the first rate parameter corresponds to a panning speed of an image sensor of the user device.

14. The computer-implemented method of claim 1, wherein the second rate parameter corresponds to a second, different panning speed of the user device.

15. The computer-implemented method of claim 1, wherein the user device comprises a wearable component.

16. One or more non-transitory computer-readable storage media storing instructions that are executable to cause one or more processors to perform operations, the operations comprising:
  obtaining a data structure configured for rendering a plurality of content containers on a user device, the plurality of content containers providing a collapsed configuration and an expanded configuration;
  rendering, based on a first rate parameter descriptive of a user input associated with the user device, one or more of the plurality of content containers according to the collapsed configuration; and
  rendering, based on a second rate parameter, at least one of the plurality of content containers according to the expanded configuration;
  rendering first party content from a first server system in the one or more of the plurality of content containers according to the collapsed configuration; and
  rendering third party content from a second server system in the at least one of the one or more of the plurality of content containers according to the expanded configuration.

17. A system, comprising:
one or more processors; and
one or more non-transitory computer-readable storage media storing instructions that are executable by the one or more processors to cause the system to perform operations, the operations comprising:
  obtaining a data structure configured for rendering a plurality of content containers on a user device, the plurality of content containers providing a collapsed configuration and an expanded configuration;
  rendering, based on a first rate parameter descriptive of a user input associated with the user device, one or more of the plurality of content containers according to the collapsed configuration; and
  rendering, based on a second rate parameter, at least one of the plurality of content containers according to the expanded configuration;
  rendering first party content from a first server system in the one or more of the plurality of content containers according to the collapsed configuration; and
  rendering third party content from a second server system in the at least one of the one or more of the plurality of content containers according to the expanded configuration.

18. The system of claim 17, comprising:
an augmented reality display.

19. A computer-implemented method, comprising:
obtaining, by a computing system comprising one or more processors, a data structure configured for rendering a plurality of content containers on a user device, the plurality of content containers providing a collapsed configuration and an expanded configuration;
rendering, by the computing system and based on a first rate parameter descriptive of a user input associated with the user device, one or more of the plurality of content containers according to the collapsed configuration;
rendering, by the computing system, a first set of third party content from a server system in the one or more of the plurality of content containers according to the collapsed configuration;
rendering, by the computing system and based on a second rate parameter, at least one of the plurality of content containers according to the expanded configuration; and
rendering, by the computing system, a second set of third party content from the server system in the at least one of the one or more of the plurality of content containers according to the expanded configuration, wherein the second set comprises additional content relating to an element of the first set.

20. One or more non-transitory computer-readable storage media storing instructions that are executable to cause one or more processors to perform operations, the operations comprising:
obtaining a data structure configured for rendering a plurality of content containers on a user device, the plurality of content containers providing a collapsed configuration and an expanded configuration;
rendering, based on a first rate parameter descriptive of a user input associated with the user device, one or more of the plurality of content containers according to the collapsed configuration;
rendering a first set of third party content from a server system in the one or more of the plurality of content containers according to the collapsed configuration;
rendering, based on a second rate parameter, at least one of the plurality of content containers according to the expanded configuration; and
rendering a second set of third party content from the server system in the at least one of the one or more of the plurality of content containers according to the expanded configuration, wherein the second set comprises additional content relating to an element of the first set.

21. A system, comprising:
one or more processors; and
one or more non-transitory computer-readable storage media storing instructions that are executable by the one or more processors to cause the system to perform operations, the operations comprising:
obtaining a data structure configured for rendering a plurality of content containers on a user device, the plurality of content containers providing a collapsed configuration and an expanded configuration;
rendering, based on a first rate parameter descriptive of a user input associated with the user device, one or more of the plurality of content containers according to the collapsed configuration;
rendering a first set of third party content from a server system in the one or more of the plurality of content containers according to the collapsed configuration;
rendering, based on a second rate parameter, at least one of the plurality of content containers according to the expanded configuration; and
rendering a second set of third party content from the server system in the at least one of the one or more of the plurality of content containers according to the expanded configuration, wherein the second set comprises additional content relating to an element of the first set.

22. The system of claim 21, wherein the second set of third party content was fetched from the server system responsive to determining the second rate parameter.

23. The system of claim 22, wherein the operations comprise:
transmitting, to the server system, responsive to determining the second rate parameter, a request for additional content based on the first set of third party content.

* * * * *